United States Patent [19]
du Boullay

[11] 4,346,462
[45] Aug. 24, 1982

[54] SEISMIC PROSPECTING METHOD PROVIDING FOR THE DETERMINATION OF THE FLANK DIP OF SUBTERRANEAN LAYERS AND DEVICE FOR CARRYING OUT THE SAME

[75] Inventor: Benoît T. du Boullay, Sevres, France

[73] Assignee: Institut Francais du Petrole, Rueil Malmaison, France

[21] Appl. No.: 872,361

[22] Filed: Jan. 26, 1978

[30] Foreign Application Priority Data

Jan. 28, 1977 [FR] France ............................. 77 02690

[51] Int. Cl.³ ............................................ G01V 1/30
[52] U.S. Cl. ...................................... 367/61; 367/23; 364/421
[58] Field of Search ............... 340/15.5 HG, 15.5 TC, 340/15.5 F; 364/421, 103; 367/23, 61

[56] References Cited

U.S. PATENT DOCUMENTS

| | | | |
|---|---|---|---|
| 2,894,596 | 7/1959 | Flatow et al. | 340/15.5 F |
| 3,406,777 | 10/1968 | Bemrose | 340/15.5 TC |
| 3,431,999 | 3/1969 | Glazier | 340/15.5 TC |
| 4,146,870 | 3/1979 | Ruehle | 340/7 R |

*Primary Examiner*—Nelson Moskowitz
*Attorney, Agent, or Firm*—Craig and Antonelli

[57] ABSTRACT

Seismic prospecting method for determining the flank dip of subterranean layers with respect to the plane of a seismic profile, comprising sequentially transmitting acoustic waves with different directivity diagrams, recording the corresponding reflected waves, combining, according to a determined law, the transmitted acoustic intensities and, separately, values representative of the intensity of the reflected waves, in each of the directivity diagrams and comparing the results of said separate combinations.

21 Claims, 8 Drawing Figures

SEISMIC PROSPECTING METHOD PROVIDING FOR THE DETERMINATION OF THE FLANK DIP OF SUBTERRANEAN LAYERS AND DEVICE FOR CARRYING OUT THE SAME

This invention relates to a method for seismic prospecting of the sub-soil, adapted to determine the flank dip of subterranean layers and to a device for carrying out the same.

More precisely, the invention concerns a method for determining the flank dip of acoustic wave reflecting layers with respect to the plane of a seismic profile.

According to the conventional seismic prospecting methods, a seismic wave transmitter and a receiver comprising a plurality of sensors are arranged substantially in line in the plane of a seismic profile on survey.

Seismic shocks are generated in the earth, propagate therethrough, are reflected on reflecting layers commonly called reflectors or mirrors and then are sensed by a receiver. Each propagation plane defined by the emisson point, the reception point and the point of reflection of the seismic waves on a reflector, is perpendicular to said reflector and crosses it along a straight line.

Conventional seismic methods provide by analysis of the recordings of the sensed seismic waves, for the determination of the longitudinal dip of the reflectors i.e. the angle formed between the intersection line and the horizontal line. On the contrary, no information concerning the flank dip angle of the reflectors, i.e. the angle formed by each propagation plane and the vertical plane, can be obtained from these recordings.

Seismic prospecting methods more recently developed provide for a tri-dimensional representation of the sub-soil. These methods consist essentially of generating seismic shocks successively in a plurality of points on both sides of a line of sensors, of receiving by sensors the echoes of the shocks successively transmitted onto the different reflectors and of recording the signals generated by the sensors in response to said echoes. To each couple "emission point-reception point", corresponds a series of reflection points. A recording trace is associated to each series of points.

By changing the relative location of the transmission points with respect to the reception points, there can be obtained a very large number of recordings representative of a volume of terrain. There recorded traces are subjected to usual processing operations of corrections and correlations in order to improve the signal-to-noise ratio. The comparison of the recordings after processing provides for a representation of the configuration of each reflecting layer wherefrom its dip can be determined.

The disadvantage of these prior processing methods consists in the fact that they cannot be performed except by using computers provided with very substantial software. The exploitation of the results requires a substantial amount of work for tests and for perfecting the method.

The seismic prospecting method according to this invention makes it possible to determine, in addition to the longitudinal dip, the flank dip of the subterranean layers which reflect the acoustic waves, while avoiding to a large extent the recording processings required by the prior methods.

It comprises transmitting sequentially acoustic waves in accordance with several different directivity diagrams through the medium on survey, receiving the waves reflected by the reflecting layers in a plurality of reception points arranged along a line substantially parallel to the profile plane, and recording the echoes on the reflecting layers of the acoustic waves transmitted in accordance with each of said directivity diagrams. This method is remarkable in that the processing of the recorded signals comprises a first combination, according to a determined law, of the transmitted acoustic intensities, quoted for each transmission direction in each of the directivity diagrams of the transmission device, a second combination, performed in accordance with an identical law, of the respective values of at least one parameter representing the intensity of the reflected acoustic waves, reported on the recordings corresponding to the different directivity diagrams and the comparison of the results of the two combinations.

The representative parameter may be the mean absolute value or the root mean square value of the amplitude of the signals recorded over a time interval substantially equal to the transmission time.

Other features and advantages of the method will be made apparent from the following description, taken with reference with the accompanying drawings wherein.

Figure 1:
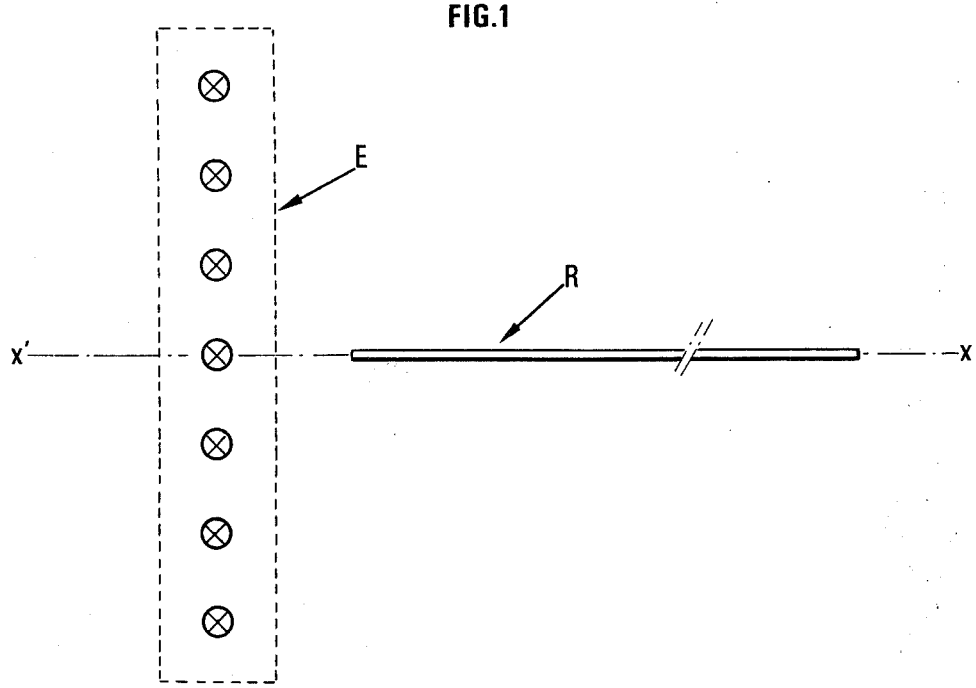
FIG. 1 is a schematic view of the transmission system in a general case.

According to the embodiment of FIG. 1, the reception device comprises a receiving assembly R consisting of a large number of sensors arranged substantially in line. In the case where the device of the invention is used for marine seismic prospecting, the sensors are arranged in a sheath or streamer towed behind a ship. The line of sensors corresponds to the intersection with a horizontal plane of a vertical reference plane X'X substantially parallel to the seismic profile on survey.

The transmission device E is preferably placed transversely with respect to the plane of the profile. It transmits, in a directive manner, the acoustic waves through the medium on suvey. Its directivity diagram in a plane perpendicular to the plane of the profile, may be given several different configurations or orientations.

It may consist for example of a plurality of sources arranged at different distances from the profile plane. Preferably, there are used sources transmitting acoustic waves in the form of short acoustic pulses, generated, for example, by implosion or produced by spark generators, air guns or explosives.

Figure 2A:
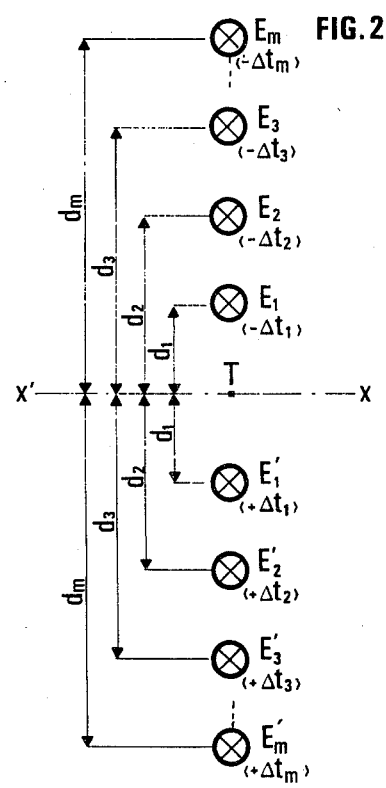
FIG. 2A shows a preferred embodiment of the transmission device comprising an even number $2m$ of distinct sources.

The transmission device comprises, in the general case, a number $m$ of source couples $(E_1, E'_1)$, $(E_2, E'_2)$-$(E_m, E'_m)$, the sources of each couple being arranged symmetrically with respect to a reference point T (FIG. 2A) which may be located in the plane of the profile X'X. The sources are arranged in line and, preferably, along a direction substantially perpendicular to the sensors line, but this arrangement is not limitative. The sources $E_1$, $E_2-E_m$ and their symmetrical sources are respectively placed at distances $d_1$, $d_2-d_m$ from the reference point T.

The sources forming the transmission device are triggered sequentially.

In this specification, the term average transmission time of a couple of sources means the half-sum of the transmission times counted with respect to an arbitrary time origin. The couples of sources are triggered in a such a manner that the same average transmission time may be attributed thereto.

Figure 2B:
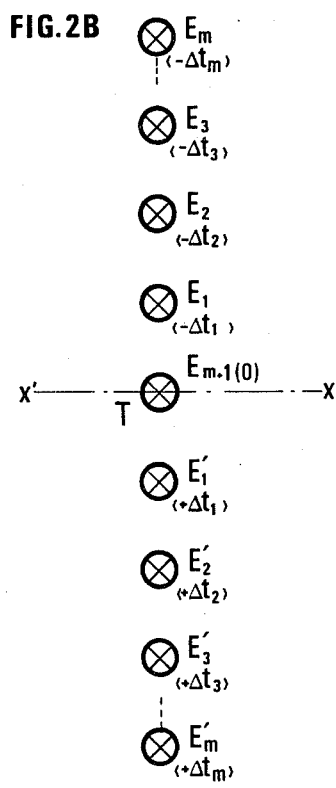
FIG. 2B shows a preferred embodiment of the transmission device comprising an odd number $2m+1$ of distinct sources.

According to an alternative embodiment, an additional source $E_{m+1}$ (FIG. 2B) is located at the reference point. It is then convenient to select the triggering time of source $E_{m+1}$, which is placed or may be placed at point T, as a time origin.

Thus, when the triggering times of sources $E_1$, $E_2-E_m$ are respectively shifted by time intervals $(-\Delta t_1)$, $(-\Delta t_2)-(-\Delta t_m)$, with respect to the initial triggering instant of the source $E_{m+1}$ located at point T, the symmetrical sources $E_1'$, $E_2'-E_m'$, with respect to that point $E_{m+1}$, are successively triggered with respective time shifts $(+\Delta t_1)$, $(+\Delta t_2)-(+\Delta t_m)$ with respect to that initial triggering instant.

The triggering of the sources following a first sequence, at time intervals $\Delta t_1$, $\Delta t_2-\Delta t_m$, has the effect of making directive the transmission diagram of the device and giving it a first configuration or orientation. The triggering of the sources according to a further sequence of different time intervals, changes the configuration or orientation of the directivity diagram of the transmission device. Accordingly, it is possible to provide a transmission device having p different directivity diagrams corresponding to an identical number p of different triggering time interval sequences $\Delta t_1$, $\Delta t_2-\Delta t_m$.

By shot it is meant, hereinafter, the shifted triggering of the assembly of the sources constituting the transmission device, according to any sequence of times intervals $\Delta t_1$, $\Delta t_2-\Delta t_m$ and, by shot point, the location T of intersection of the sources line and of the sensors line at the initial instant, which is, as already mentioned, the triggering time of the source which is placed, or may be placed, at point T.

In the case of earth seismic prospecting, the sources and the reception device R are stationary at the instants when the seismic shots are performed. The shot point is, in that case, located on a point of the earth on a vertical line passing through the point of intersection of the line of sensors and the line of sources.

The sources being arranged in line and point T selected in the profile plane, the first shot is performed by selecting a first set of values $\Delta t_1$, $\Delta t_2-\Delta t_m$ and by taking care that the average transmission times of all the couples of sources be identical. Then, the echoes of the transmitted acoustic waves are recorded. Then there are successively performed (p−1) further shots by changing at each time the time interval sequence $\Delta t_1$, $\Delta t_2-\Delta t_m$, so as to obtain, at each time, a different directivity diagram and by performing the corresponding recordings.

Then the sources are all displaced and arranged along a line passing successively by other points T selected in the profile plane. At each point, there are performed a sequential series of shots each comprising p successive shots by applying the same time interval sequences for the triggering as those applied during the shots performed at the preceding shot point. It results therefrom that the transmission diagram of the sources is identical for all the shots whose serial number differ by a multiple of p.

In the case of marine seismic prospecting, the reception device R and the transmission device E are towed behind a ship which progresses in a continuous manner along a road parallel to the profile on survey. The point T is continuously displaced and, at regular intervals along the profile, there is performed a sequential series of shots each comprising p successive shots while changing the time interval sequence $\Delta t_1$, $\Delta t_2-\Delta t_m$ so as to associate to each position of point T a different directivity diagram.

As precedingly, the recurrence period of the shots having the same directivity diagram is p and all the shots whose serial numbers differ by a multiple of p have the same directivity diagram.

Preferably, the recordings are performed with multiple coverage of order n according to a well-known method. This means essentially that the recorded traces may be classified by groups of n traces so that all the traces of the same group correspond to the recordings of acoustic waves reflected substantially by the same point M of a reflecting surface. The point M is commonly called the mirror-point.

It has been demonstrated that, by replacing by their sum the n traces of each group, the level of the random noise on the recording traces is divided by $\sqrt{n}$. This process is described more in detail in the U.S. Pat. No. 2,732,906.

The multiple coverage operation comprises, according to the method of the invention, the selection, among the successive recording traces obtained by cyclically changing, at each shot, the directivity diagram of the transmission device, of those which correspond to the same configuration or orientation of said diagram. p being the number of configurations or orientations, p groups of traces are selected and a multiple coverage of n/p order is performed on the traces of each group.

Once the optional multiple coverage processing has been performed, there is obtained a number p of trace assemblies, each being associated to a different directivity diagram. A processing operation is then performed in order to determine the flank dip of the reflecting layers.

Figure 3:
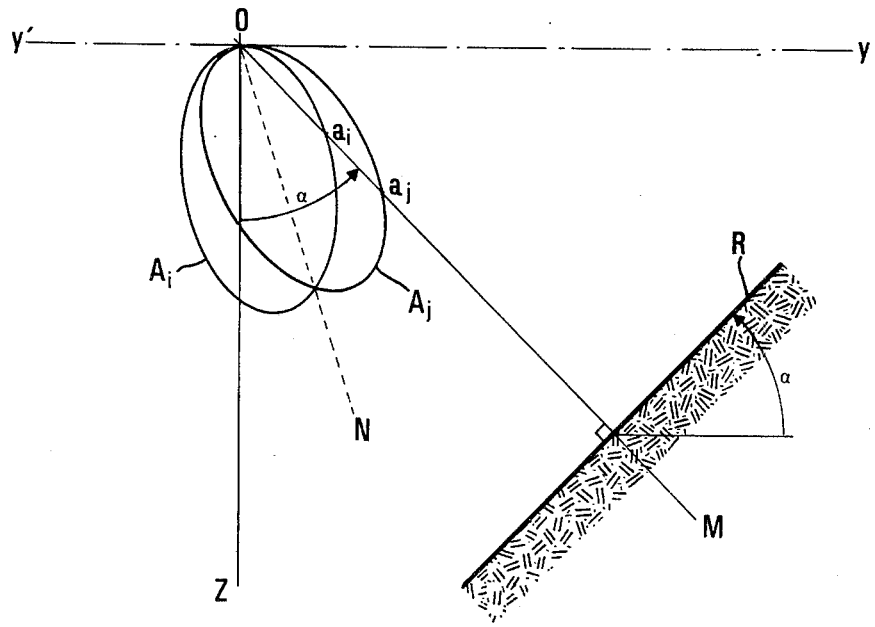
FIG. 3 shows two separate directivity diagrams of the transmission device.

It is assumed that the transmission device comprises a number p of different directivity diagrams in the plane OYZ perpendicular to the profile plane and that any couple Ai and Aj thereof is shown on FIG. 3. The directivity diagrams Ai and Aj being different from each other, the energy transmitted in any selected direction OM when the directivity diagram of the device corresponds to configuration Ai is different from that transmitted when the diagram corresponds to configuration Aj, except a certain number of directions such as ON where the energies transmitted may be identical. The shape of the directivity diagrams Ai and Aj of the transmission device being known, it is possible to associate to each direction of the half-plane below axis Y'Y, a couple of values ai aj, representing the energy transmitted in these two diagrams.

The energy reflected along direction OM and corresponding to the acoustic waves successively transmitted along the two directivity diagrams Ai and Aj will be respectively proportional to values ai and aj associated with this direction. By comparing the energies of the reflected waves, on the recordings, respectively corresponding to the two directivity diagrams, there are determined the couples of energy values which are compared with the couples of values (ai, aj) associated to each transmisson-reception direction. When there is found a correspondance with a particular couple of values (ai, aj) it is possible to deduce therefrom that the received energy has been reflected by a mirror having a flank dip α corresponding to that particular couple of values.

Figure 4:
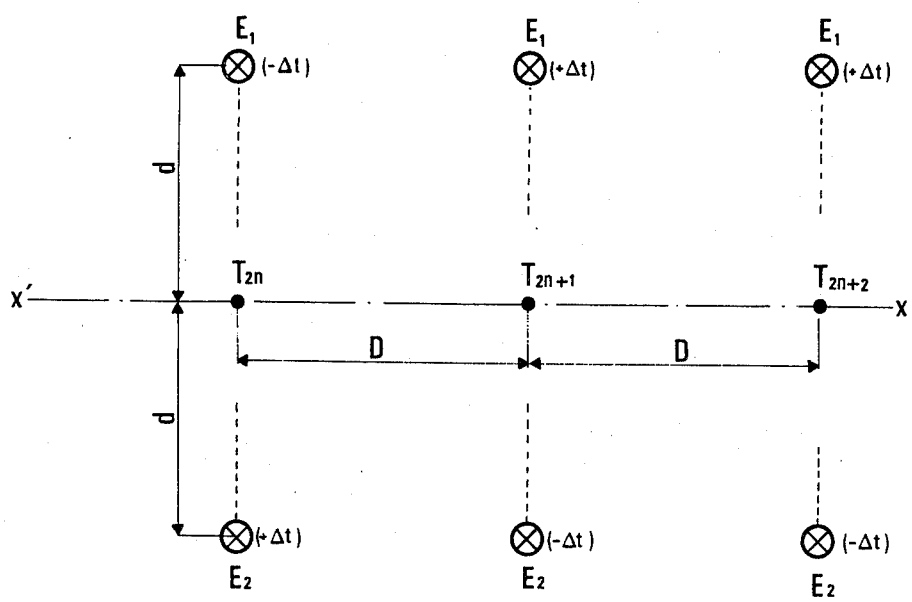
FIG. 4 shows a particular example of the preferred embodiment of FIG. 2A.

It is clear that it is the same mirror or the same portion of mirror which reflects the waves whose energies are compared and that it is thus possible to disregard the reflection coefficient of the layer. According to a particular embodiment, the seismic prospecting method according to the invention is performed by using a transmission device comprising two acoustic pulse sources $E_1$, $E_2$ and a streamer towed behind a ship, not shown (FIG. 4). The two sources are maintained in a substantially symmetrical arrangement with respect to point T of the profile plane and at a distance d therefrom which may, for example, be in the range from 10 to 20 meters.

Figure 5:
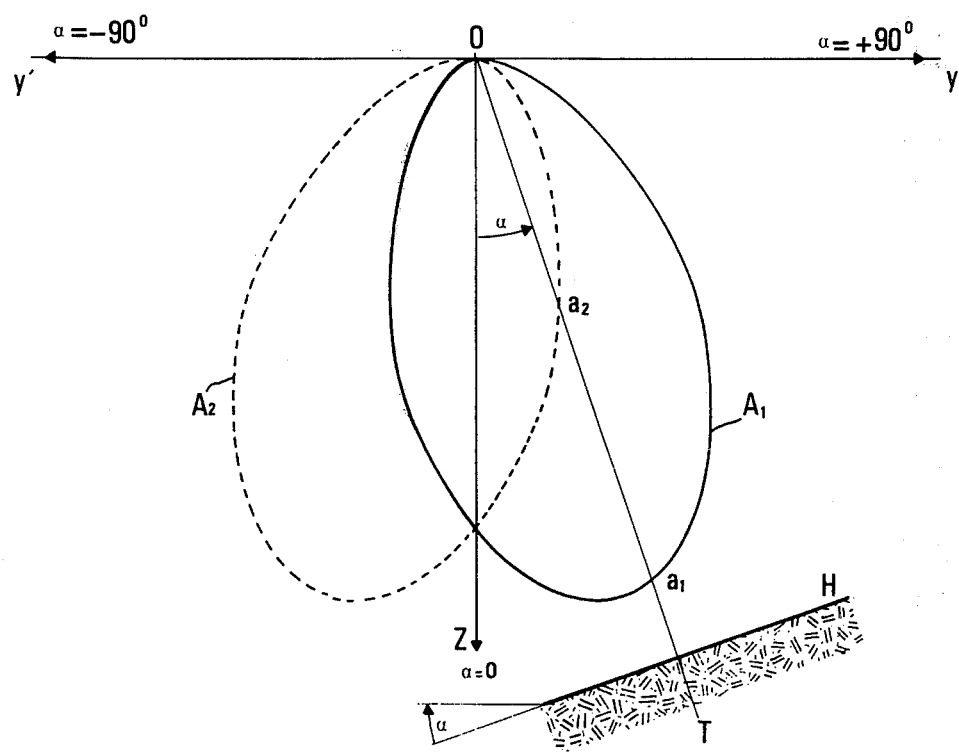
FIG. 5 shows the directivity diagrams of the device of FIG. 4.

At a shot point $T_{2n}$ of the profile, the source $E_1$ is triggered. After a time interval of $2\Delta t$, the source $E_2$ is triggered. The directivity diagram of the transmission device, in a plane perpendicular to the profile plane, corresponds, for this shot, to diagram $A_1$ (FIG. 5).

The ship having moved, a new shot is formed at a point $T_{2n+1}$, spaced at a distance D from shot point $T_{2n}$ which may be of the order of a few tens meters, according to the ship speed and/or the time interval selected between the successive shots.

But, for this shot, source $E_2$ is the first to be actuated and then source $E_1$, after the same time interval $2\Delta t$. The directivity diagram $A_2$ of the transmission device, in a plane perpendicular to the profile plane, has substantially the same configuration as diagram $A_1$ but is oriented symmetrically with respect to the vertical line OZ.

During the following shots, at points $T_{2n+2}$, $T_{2n+3}$, etc. of the profile, the order of the shots by sources $E_1$ and $E_2$ is reversed at each time. The number of configurations p being 2, the same directivity diagram of the transmission device is obtained for one of two shots. n being the order of multiple coverage at the recording, the successively obtained recordings are separated in two groups corresponding respectively to the directivity diagrams $A_1$ and $A_2$. In order to increase the signal-to-noise ratio, it is preferable to proceed with a multiple coverage of order n/2 on the recordings of the two groups.

The following step is that of the comparison of the recordings.

This operation is made easier when, preliminarily, there is established a function D representative of the differences between the energies transmitted along the transmission directions included in the two directivity diagrams $A_1$ and $A_2$.

The shape of these two diagrams being known, the characteristic values $a_1$ and $a_2$ of the energies transmitted along each direction OT (FIG. 5) separating these two diagrams, is measured, and the relative amplitude difference D is calculated, as expressed for example by the relationship:

$$D(\alpha) = \frac{a_1 - a_2}{a_1 + a_2} \quad (1)$$

wherein α is the inclination of OT with respect to the vertical line and represents the flank dip of reflector H.

The selected function D has the advantage of having no dimension and of being anti-symmetrical with respect to variable α. It is obvious however that any other function D representative of the differences between the energies may be used without departing from the scope of the invention.

Figure 6:
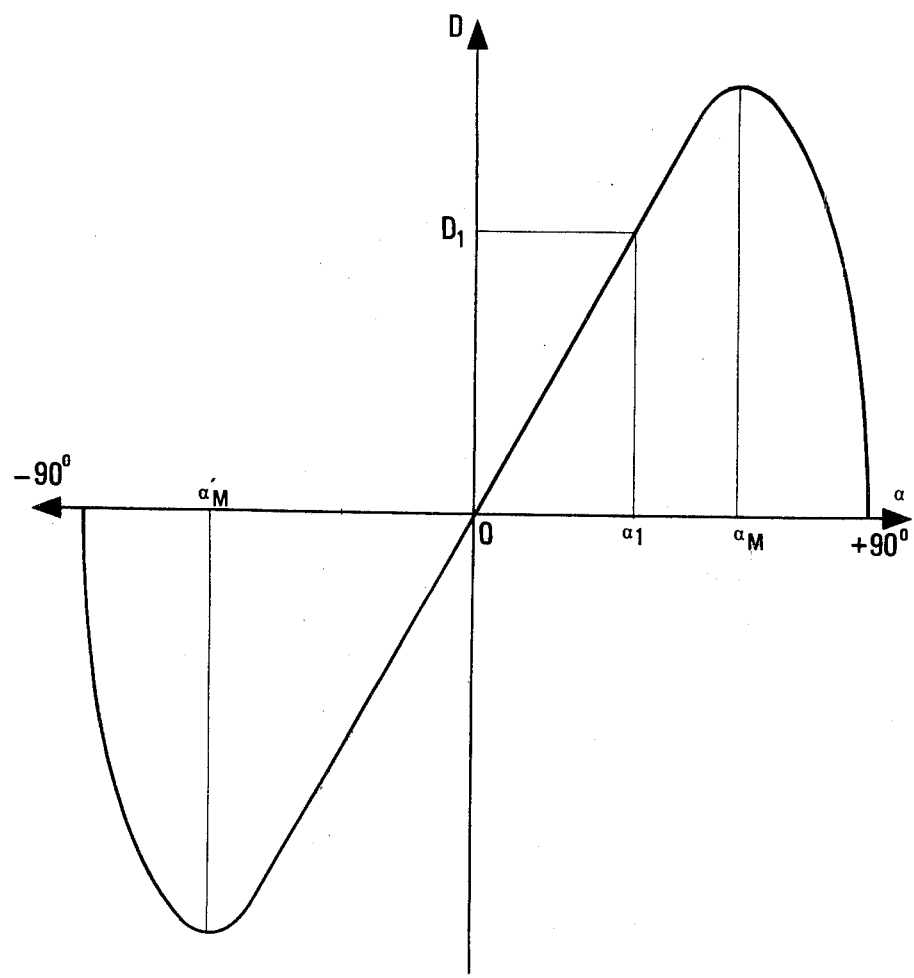
FIG. 6 illustrates a function representative of the difference between the two directivity diagrams shown on FIG. 5.

A practical example of the curve representing the function D, in relation with α, is illustrated in FIG. 6. The two directivity diagrams being substantially symmetrical with respect to a vertical line, the representative curve of function D is symmetrical with respect to origin O and increases steadily when the angle α varies between values $-\alpha_M$ and $+\alpha_M$. For values of α lower than $-\alpha_M$ or higher than $\alpha_M$, the function D is decreasing.

By a suitable selection of the number of sources and of the shifting time intervals between their triggering instants, it is possible to bring the maximum value $\alpha_M$ beyond 60°.

In practice, the flank dip of the reflecting subterranean layers is always lower than 60° and to each value of function D is attributed a single corresponding value of angle α which defines the flank dip.

Once the multiple coverage operation of order n/2 has been performed, there is measured, on the two resulting sets of recordings, the respective values of the parameters characterizing the energy reflected by each reflector. These values are then compared by determining the value of function D in accordance, for example, with the relationship (1) wherefrom is deduced the value of the flank dip angle α of each reflector.

A source $E_3$ may be located between the two sources $E_1$ and $E_2$ at equal distance therefrom. In this case, the triggering instant for source $E_3$ is taken as the time origin and sources $E_1$ and $E_2$ are triggered symmetrically with respect to this origin. The use of a third source has the practical advantage of increasing the acoustic energy transmitted to the earth at each shot.

Figure 7:
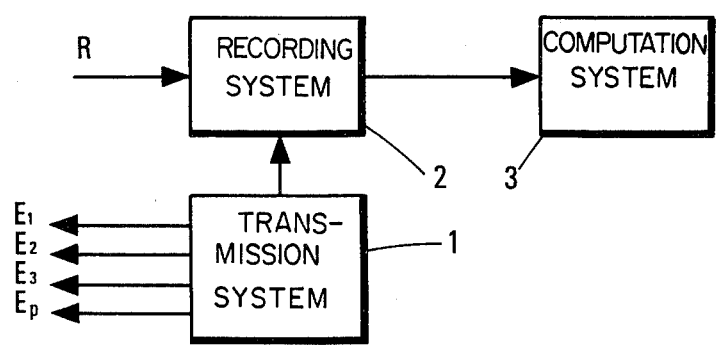
FIG. 7 shows a general embodiment of a system for carrying out the method.

The device for carrying out the invention (FIG. 7) comprises a transmission system 1 adapted to control sources $E_1$, $E_2$-$E_m$ used with selected time shifts and to define a time scale or base for a recording system 2 connected to the reception device R. The signals read on the performed recordings are introduced in a computation and exploitation system 3 where the respective dips of the subterranean reflectors may be calculated in accordance with the method of the invention.

The significant parameters representing the intensity of the reflections to which the transmitting acoustic waves have been subjected, may be, by way of non limitative example, the root mean square value or the mean absolute value of the amplitude of the recording signals over a reference time interval.

In the case of use of several sources, sequentially triggered, the reference time interval will be selected of the same order than the total duration of the pulses transmitted from said sources.

What I claim:

1. A seismic prospecting method for determining the flank dip of subterranean layers in a medium reflecting acoustic waves, with respect to the plane of a seismic profile by using a transmitting device capable of transmitting acoustic waves through the medium on survey according to a plurality of different directivity diagrams comprising:

sequentially actuating the transmitting device a plurality of times while changing the directivity diagram for each of said plurality of times;

sequentially receiving the waves reflected by reflecting layers of said medium in a plurality of reception points arranged along a line substantially parallel to the profile plane;

recording the echoes, on said reflecting layers, of the acoustic waves transmitted according to each of the directivity diagrams;

and processing the recorded signals, said processing comprising combining the transmitted acoustic intensities according to a predetermined relationship for each transmission direction in each of the directivity diagrams of the transmission device to form a first combination, combining the respective values of at least one parameter representing the intensity of the reflected acoustic waves recorded on the recordings corresponding to the different directivity diagrams according to the same predetermined relationship to form a second predetermined combination, and comparing the results of the two combinations to determine the flank dip.

2. A seismic prospecting method according to claim 1, wherein the parameter representing the intensity of the reflected waves is the mean absolute value of the signals recorded during a time interval substantially equal to the transmission time.

3. A seismic prospecting method according to claim 1, wherein the parameter representing the intensity of the reflected waves is the root mean square value of the amplitude of the recorded signals over a time interval substantially equal to the transmission time.

4. A seismic prospecting method according to claim 1, wherein at each location of a series of locations selected in the plane of the seismic profile, there are performed several transmissions the directivity diagram of the transmission being changed for each of them.

5. A seismic prospecting method according to claim 1, wherein a single transmission is performed at each location of a series of locations selected in the plane of the seismic profile and two successive transmissions are performed with different directivity diagrams.

6. A seismic prospecting method according to claim 4, wherein the transmission is performed successively with at least two directivity diagrams, in a plane perpendicular to the seismic profile plane, symmetrical with respect to said plane.

7. A seismic prospecting method according to claim 5, wherein the transmission is performed successively with at least two directivity diagrams, in a plane perpendicular to the seismic profile plane, symmetrical with respect to said plane.

8. A seismic prospecting method for determining the flank dip of subterranean layers in a medium reflecting acoustic waves, with respect to the plane of a seismic profile by using a transmitting device capable of transmitting acoustic waves through the medium on survey according to a plurality of different directivity diagrams comprising:

sequentially actuating the transmitting device a plurality of times while changing the directivity diagram for each of said plurality of times;

sequentially receiving the waves reflected by reflecting layers of said medium in a plurality of reception points arranged along a line substantially parallel to the profile plane;

recording the echoes on said reflecting layers of the acoustic waves transmitted according to each of the directivity diagrams;

and processing the recorded signals, said processing comprising combining the transmitted acoustic intensities according to a predetermined relationship for each transmission direction in each of the directivity diagrams of the transmission device to form a first combination, combining the respective values of at least one parameter representing the intensity of the reflected acoustic waves recorded on the recordings corresponding to the two directivity diagrams according to the same predetermined relationship to form a second combination, and comparing the results of the two combinations to determine the flank dip, said predetermined relationship being so selected that a single value of the result of the first combination corresponds to each value of the transmission angle.

9. A seismic prospecting method according to claim 8, wherein said second combination is performed by determining the values of a function depending on the ratio of the difference between said parameters and the sum of said parameters and the first combination is performed by determining the value of a function depending on the ratio between the difference of the intensities transmitted in a single direction, respectively in the two different directivity diagrams and the sum of the said intensities, said intensities being read on the two directivity diagrams.

10. A seismic prospecting method for determining the flank dip of subterranean layers, in a medium reflecting acoustic waves, with respect to the plane of a seismic profile by using a transmitting device capable of transmitting acoustic waves through the medium on survey according to a plurality of different directivity diagrams comprising:

sequentially actuating the transmitting device a plurality of times while changing the directivity diagram for each of said plurality of times;

sequentially receiving the waves reflected by reflecting layers of said medium in a plurality of reception points arranged along a line substantially parallel to the profile plane;

recording the echoes from said reflecting layers of the acoustic waves transmitted according to each directivity diagram; and processing the recorded signals, said processing comprising summing the successive recording traces corresponding to each directivity diagram, combining the transmitted acoustic intensities for each transmission direction in each of the directivity diagrams of the transmission device according to a predetermined relationship to form a first combination, combining respective values of at least one parameter representing the intensity of the reflected acoustic waves recorded on the recordings corresponding to the different directivity diagrams according to the same predetermined relationship to form a second combination, and comparing the results of the two combinations to determine the flank dip.

11. A method according to claim 10, wherein the acoustic waves are successively transmitted in accordance with two directivity diagrams symmetrical with respect to the profile plane and in that the corresponding recording traces corresponding to the two directivity diagrams are summed up.

12. A device for carrying out the method according to the claim 1, comprising a transmitting device, a reception device including a plurality of receivers arranged along a line substantially parallel to the seismic profile plane, means for recording the reflected acoustic waves, means for determining the values of the parameters representing the intensity of the reflected acoustic waves and means for combining the respective values of said parameters and for comparing the results of said second combination with the results of said first combination.

13. A device according to claim 12, wherein the transmission device comprises several sources of acoustic wave transmission and means for triggering said sources sequentially.

14. A device according to claim 12, wherein the transmission device comprises several acoustic waves transmission sources and means for applying predetermined time shifts between said sources.

15. A device according to claim 14, wherein the transmission device comprises an even number of sources symmetrically arranged with respect to a point.

16. A device according to claim 14, wherein the transmission device comprises sources symmetrically arranged with respect to a point, where is located a central source.

17. A device according to claims 15 or 16, wherein said point is on the sensors line.

18. A device according to claim 12, wherein the sources are arranged on a line having a direction substantially perpendicular to the sensors line.

19. A device for carrying out the method according to the claim 11, comprising a transmitting device, a reception device comprising a plurality of receivers arranged along a line substantially parallel to the seismic profile plane, means for summing up the recorded traces corresponding respectively to the two directivity diagrams, means for determining the values of parameters representing the intensity of the reflected acoustic waves and means for performing a second combination of the respective values of said parameters and for comparing the results of said second combination with the results of said first combination.

20. A method according to claim 1, 8, or 10, wherein the plane of the seismic profile is a vertical plane.

21. A method according to claim 1, 8, or 10, wherein the first combination represents the relative amplitude difference between transmitted acoustic waves in the different directivity diagrams, and the second combination represents the relative amplitude difference between the received acoustic waves in the different directivity diagrams.

* * * * *